Feb. 1, 1944.        T. L. FAWICK         2,340,315
         ASSEMBLY FOR CLUTCHES, BRAKES, AND THE LIKE
             Filed Sept. 18, 1940       3 Sheets-Sheet 1
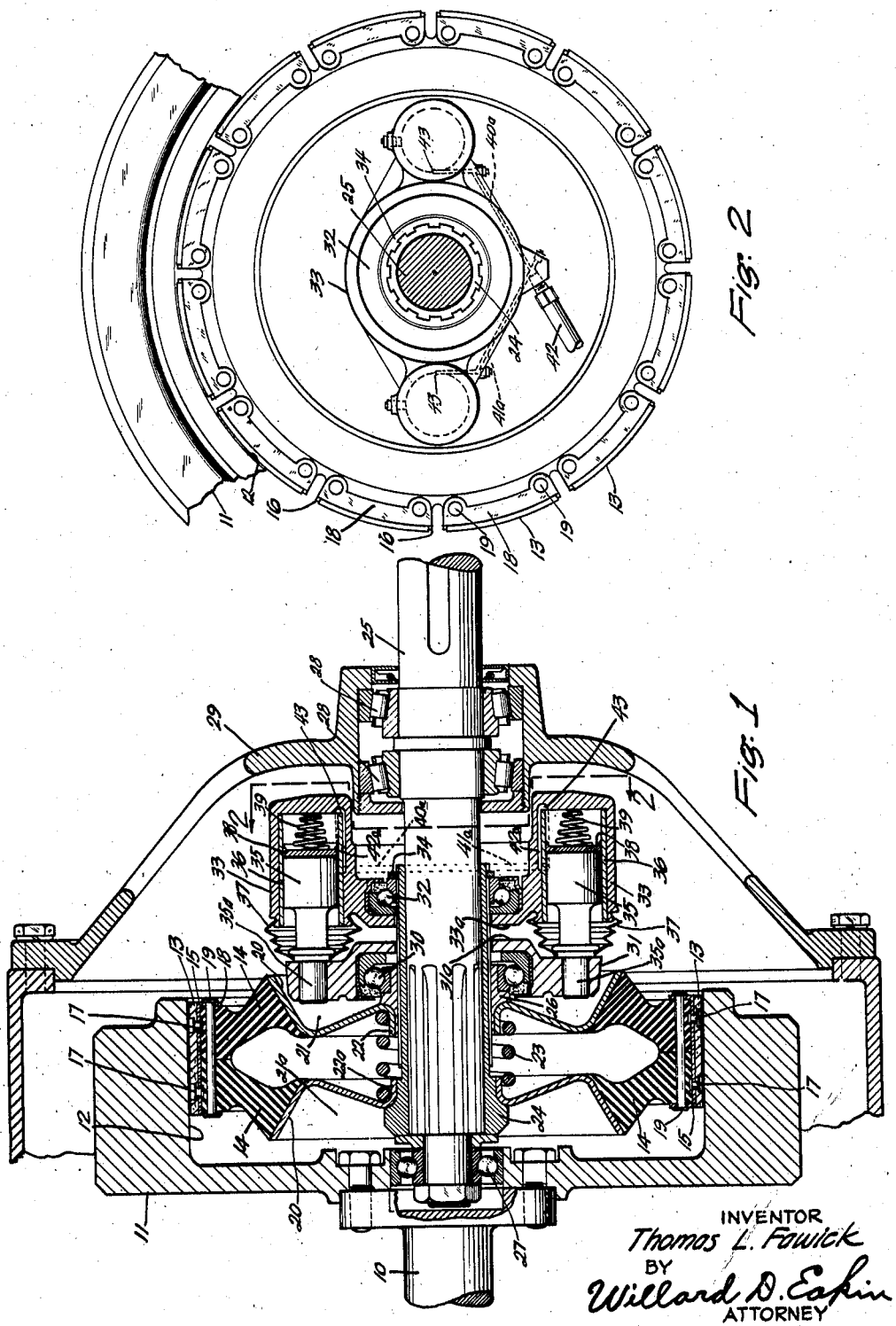
INVENTOR
Thomas L. Fawick
BY
Willard D. Eakin
ATTORNEY

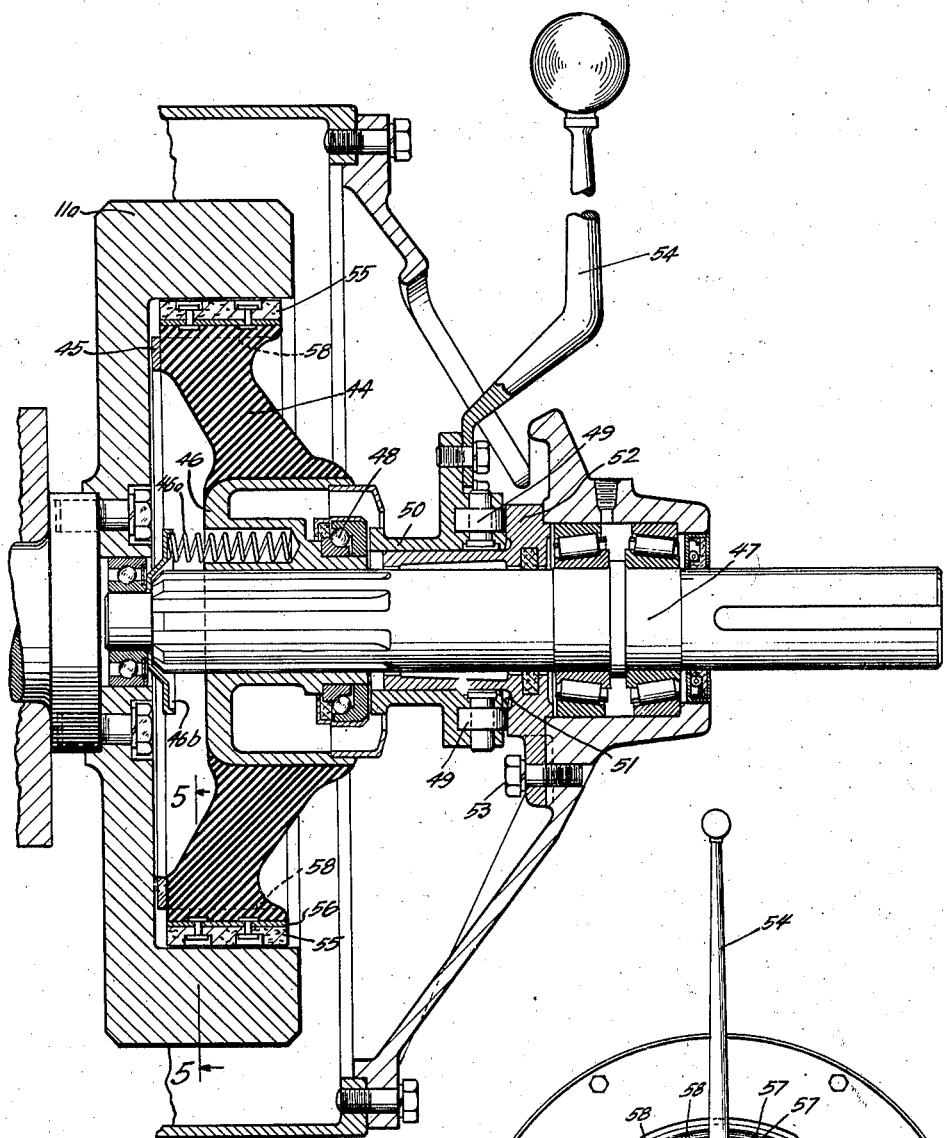

INVENTOR
Thomas L. Fawick
BY
Willard D. Eakin
ATTORNEY

Patented Feb. 1, 1944

2,340,315

UNITED STATES PATENT OFFICE 2,340,315

ASSEMBLY FOR CLUTCHES, BRAKES, AND THE LIKE

Thomas L. Fawick, Akron, Ohio

Application September 18, 1940, Serial No. 357,241

13 Claims. (Cl. 192—85)

This invention relates to power-transmitting clutches and the like.

Its chief objects are to provide a clutch of simple and inexpensive construction; to provide a clutch having those advantages and adapted to cushion the torque and to provide compensation for shaft mis-alignment; and to provide simplicity and ease of operation, durability, and facility and economy in matters of assembly, disassembly and repair.

More specific objects will be manifest in the following description.

Of the accompanying drawings:

Fig. 1 is a horizontal middle section of a clutch embodying my invention in its preferred form.

Fig. 2 is a section of the same on line 2—2 of Fig. 1.

Fig. 3 is a vertical middle section of a modification.

Fig. 4 is an end elevation of the same, from the right of Fig. 3.

Figure 5:
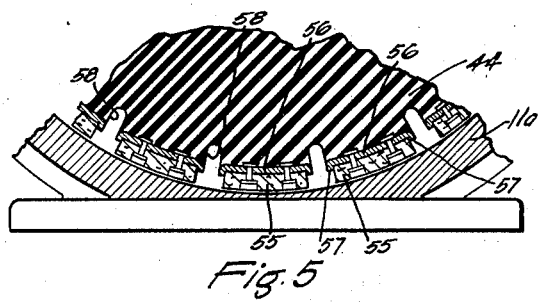
Fig. 5 is a fragmentary section on line 5—5 of Fig. 3.

Referring to the drawings, the embodiment of my invention which is shown in Figs. 1 and 2 comprises a shaft 10 having mounted thereon a bell-shaped female clutch member 11, which may be a fly-wheel, having a cylindrical inner frictional-engagement surface 12 adapted to be engaged by a circumferential series of wear shoes 13, 13 mounted upon a male clutch structure which comprises two identical, generally conical torque-transmitting and cushioning members 14, 14 which are composed of rubber or rubber-like material and are mounted with their outer, large-diameter margins in contact with each other and with their inner, small-diameter margins spaced apart axially of the assembly.

The outer, large-diameter margins of the conical rubber members 14 are adapted to be forced radially outward, to bring the wear shoes 13 into engagement with the face 12 of the bell-shaped member 11, by movement of their inner, small-diameter margins toward each other.

In this embodiment the wear shoes 13 are mounted upon the torque-transmitting and cushioning members 14 by being riveted to respective sheet-metal saddles 15, 15 having shallow outwardly bent end flanges 16, 16 for assisting the rivets, 17, 17, in preventing slipping of the shoe on the saddle. Each of the saddles has a pair of inwardly bent side flanges, 18, 18, which straddle the outer margins of the pair of members 14 and long rivets or pins 19, 19 extend through holes in the said margins and holes in the said side flanges for anchoring the saddles to the members 14.

Between the wear-shoe assemblies the members 14 are formed with radial, transverse notches extending inward from their outer peripheries so that radially outward movement of the wear shoes will not be excessively resisted by circumferential tension of the rubber.

The inner, short-diameter margins of the members 14 are secured, preferably by vulcanized adhesion, to oppositely-flared conical outer annular portions 20, 20 of respective metal stampings 21, 21ª which at their inner, short-diameter margins are formed with respective cylindrical flanges 22, 22ª which extend toward each other. Mounted with its ends in the angles formed by the bodies and the flanges 22 of the members 21, 21ª is a helical compression spring 23 which constantly urges the members 21, 21ª in directions away from each other, for assuring clutch-disengagement upon release of the clutch-engaging force.

For compelling the members 21 to rotate with each other and for permitting them to be moved toward each other for clutch engagement, the member 21ª, at its inner margin, is mounted upon and welded to a long sleeve 24 which is slip-splined upon a shaft 25 and the member 21, at its inner margin, is mounted upon and welded to a short sleeve 26 which is slip-splined upon the sleeve 24.

A pilot bearing 27 is interposed between the adjacent end portion of the shaft 25 and the hub of the bell-shaped member 11 and radial-and-thrust bearings 28, 28 are provided between the shaft 25 and a stationary member 29, which may be a part of a motor or transmission housing.

The sleeve 26 is journaled, by means of a radial-and-thrust bearing 30, in a floating actuating-yoke member 31, and the sleeve 24 projects from the sleeve 26 and is journaled, by means of a radial-and-thrust bearing 32, in a floating clutch actuating cylinder block 33 which is retained upon the end of the sleeve 24 by a snap-ring 34, the radial-and-thrust bearing 30 being adapted to force the member 21 toward the member 21ª while permitting it, with the member 21ª, to rotate, and the radial-and-thrust bearing 32 being adapted to force the member 21ª toward the member 21 while permitting it, with the member 21, to rotate.

For forcing the yoke member 31 and the cylinder-block member 33 away from each other, and thus forcing the members 21 and 21ª toward each other, for clutch engagement, pistons 35, 35 are mounted in cylinder liners 36, 36 in the block 33 and shouldered stems 35ª, 35ª of the pistons are mounted with a slip fit in holes formed in the yoke member 31, being thus adapted for easy assembly and disassembly. Bellows-like members 37, 37 close the spaces between the pistons' stems and the adjacent open cylinder ends, for excluding dirt. The pistons are provided with cup-type sealing members 38, 38 and compression springs 39, 39 are mounted in the respective cylinders for holding them well seated against the pistons when fluid pressure is not present.

The cylinder block 33 is formed with bores 40a, 41a, having connection to a fluid-supply hose 42 for conducting pressure fluid to the cylinders. At their inner ends each of the bores 40a and 41a communicates with a groove 42a formed in the wall of the respective cylinder boring and a short bore 43 in the inner face of the cylinder head, in continuation of the groove, is adapted to conduct the fluid around the end edge of the cylinder liner 32 and thus into the piston chamber defined by the liner and the cylinder head.

In the engaging of the clutch, pressure fluid being supplied to the cylinders, the cylinder block 33 and the yoke member 31 are forced apart axially of the assembly and this, through the radial-and-thrust bearings 32 and 30 and the slip-splined sleeves 24 and 26, forces the members 21a and 21 axially toward each other, the conical rubber members 14 thus being flattened by the movement of their inner, small-diameter margins toward each other, which causes a circumferential lengthening of their radially-middle, annular zones, and this, together with the toggle-like or moving-strut action of obliquely radial zones of the rubber, forces the wear shoes into contact with the inner face 12 of the bell-shaped member 11, for clutch engagement. The inner marginal flanges 22 of the members 21, 21a are adapted to contact each other and thus serve as stops in this movement, and the parts are preferably so proportioned that this occurs before the inner marginal zones of the flattening cones have gone past-center, but my invention is not thus limited. In the declutching movement, under the force of the spring 23, assisted by the resilience of the rubber members, inner margins 31a, 33a of the yoke 31 and the cylinder block 33 respectively, contact each other to provide a stop.

Because of the conical form of the outer marginal portions 20, 20 of the members 21, 21a the clutching-engaging force which is a resultant of their axial movement is a force substantially normal to their faces to which the rubber members are adhered, so that excessive strain upon the adhesive bond is not involved.

An important advantage of this embodiment of my invention is that the clutch-engaging, cone-flattening, forces are balanced, so that clutch engagement does not result in any thrust load upon either of the shafts, but only balanced thrust loads upon the bearings 30, 32 of the two floating members.

In the modification shown in Figs. 3, 4 and 5, a single generally conical torque-transmitting and cushioning member, 44, of rubber or the like, is employed and it is provided with a metal wear ring 45, preferably secured to it by vulcanized adhesion, adapted to abut a radial face of the fly-wheel, 11a, to limit movement of the outer periphery of the member 44 and thus cause the latter to be expanded in its radially outer portion, for clutch engagement, when its radially inner portion is moved toward the fly-wheel.

For providing such movement of its radially inner portion a hub member 46, on which the member 44 is secured by vulcanized adhesion, is slip-splined upon the driven shaft, 47, and, through a radial-and-thrust bearing 48, is adapted to be forced toward the fly-wheel by cam rollers 49, 49 which are journaled on radial axes on a sleeve 50 and coact with cam faces such as the face 51 formed on a sleeve 52, the sleeve 52 being secured by bolts such as the bolt 53 to a stationary part of the assembly, and the sleeve 50 being slidably mounted on the sleeve 52, and provided with an actuating hand lever 54.

Compression springs such as the spring 46a are interposed between the hub member 46 and a spring-seat washer 46b mounted upon the end of the shaft 47, for assuring clutch disengagement in case the hub member 46 is forced past-center in the clutch-engaging movement.

In this embodiment of Figs. 3, 4 and 5 the wear shoes or friction blocks, 55, 55, are riveted to respective brass plates 56, 56 which are secured to the cushion member 44 by vulcanized adhesion. Preferably the brass plates are formed with outwardly extending end flanges 57, 57 which embrace the wear blocks to assist the rivets in preventing slippage, and preferably the member 44 is formed with radial transverse grooves 58, 58 in its outer periphery, between the wear shoes, to avoid excessive resistance of the moving-strut or toggle action by circumferential tension in the member 44.

Figure 6:
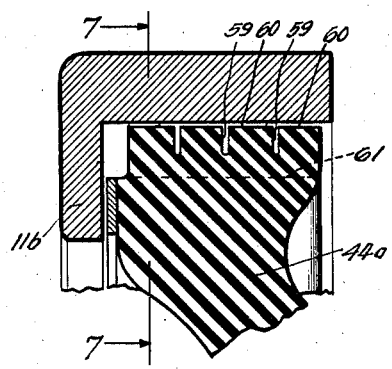
Fig. 6 is a fragmentary section, on line 6—6 of Fig. 7, illustrating an alternative type of frictional-engagement member.
Figure 7:
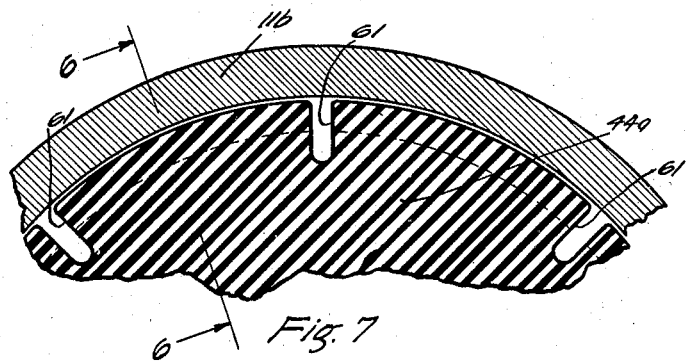
Fig. 7 is a section on line 7—7 of Fig. 6.

In the embodiment shown in Figs. 6 and 7, the wear shoes are omitted, the rubber face of the cushioning member, 44a, being adapted to contact the mating clutch member, 11b, and preferably formed with longitudinal grooves 59, 59 defined by ribs 60, 60 for strong gripping engagement and with transverse grooves 61, 61 to make the radially outer zone of the cushioning member the more easily distensible.

Figure 8:
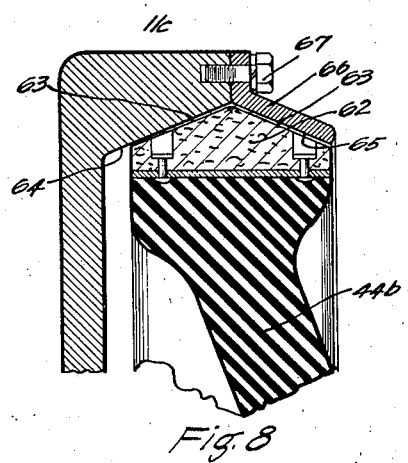
Fig. 8 is a fragmentary section of frictional-engagement members of another alternative type.

In the embodiment illustrated in Fig. 8 the cushion member, 44b, is provided with friction blocks such as the block 62 having oppositely sloped outer faces 63, 63 to provide wedging engagement respectively with oppositely tapered conical inner faces 64 and 65 on the fly-wheel, 11c, and on a ring 66 which is secured to the fly-wheel by bolts such as the bolt 67.

All of these embodiments provide some or all of the advantages set out in the above statement of objects and further modifications are possible within the scope of the appended claims.

I claim:

1. The combination of two relatively rotatable and at least approximately coaxial members, two axially opposed, generally conical deformable members mounted between the first said members and constrained to rotate with one of them and having substantially the resilient deformability of vulcanized soft rubber, and means mounted for sliding axial movement on one of the first said members for forcing peripheries of said conical members in an axial direction toward each other and thereby changing their cone angles to effect torque-transmitting connection between the first said members.

2. The combination of two relatively rotatable and at least approximately coaxial members, two axially opposed, generally conical deformable members mounted between the first said members and constrained to rotate with one of them and having substantially the resilient deformability of vulcanized soft rubber, and means mounted for sliding axial movement upon one of the first said members for forcing peripheries of said conical members in an axial direction toward each other and thereby changing their cone angles to effect torque-transmitting connection between the first said members, said conical members having their outer peripheries juxtaposed to each other and their inner peripheries more remote from each other.

3. The combination of two relatively rotatable and at least approximately coaxial members, two axially opposed, generally conical deformable elements mounted between the first said members and constrained to rotate with one of them and having substantially the resilient deformability of vulcanized soft rubber, means mounted for sliding axial movement on one of the first said members for forcing a periphery of one of the conical members in an axial direction, and friction blocks mounted upon corresponding peripheries of said conical members.

4. The combination of two relatively rotatable and at least approximately coaxial members, two axially opposed, generally conical deformable members mounted between the first said members and constrained to rotate with one of them, said conical members having juxtaposed peripheries, means additional to them for connecting said peripheries, and friction blocks mounted on said connecting means.

5. The combination of two relatively rotatable and at least approximately coaxial members, two opposed, generally conical elements mounted between the members and constrained to rotate with one of them and having substantially the resilient deformability of vulcanized soft rubber, said conical elements being non-integral with each other, and means connecting juxtaposed peripheries of them to each other, the said connecting means comprising friction members and pins which extend through the said juxtaposed peripheries and anchor the friction members thereto.

6. The combination of two relatively rotatable and at least approximately coaxial members, a generally conical body of material having substantially the resilient deformability of vulcanized soft rubber mounted between them and constrained to rotate with one of them, and means mounted for axial sliding movement on one of said members for applying force to said body in an axial direction at one of its peripheries, in conjunction with means for resisting axial movement of its other periphery, to increase its cone angle and thus effect torque-sustaining connection between said members.

7. The combination of two relatively rotatable and at least approximately coaxial members, a generally conical, torque-sustaining body of material having substantially the resilient deformability of vulcanized soft rubber mounted between them and constrained to rotate with one of them, and means mounted for axial sliding movement on one of said members for applying force to said body in an axial direction at one of its peripheries, in conjunction with means for resisting axial movement of its other periphery, to increase its cone angle and thus effect torque-sustaining connection between said members.

8. The combination of two relatively rotatable and at least approximately coaxial members, a body of material having substantially the resilient deformability of vulcanized soft rubber mounted between them, and means mounted for axial sliding movement on one of said members, in conjunction with means for resisting movement of translation of said body, for squeezing said body in an axial direction, and thus compelling it, solely by reason of the squeezing, to extend itself radially by deformation, for effecting torque-sustaining connection between said members, said squeezing means being operable while the said body is rotating.

9. The combination of two relatively rotatable and at least approximately coaxial members, a torque-sustaining body of material having substantially the resilient deformability of vulcanized soft rubber mounted between them, and means mounted for axial sliding movement on one of said members, in conjunction with means for resisting movement of translation of said body, for squeezing said body in an axial direction, and thus compelling it, solely by reason of the squeezing, to extend itself radially by deformation for effecting torque-sustaining connection between said members, said squeezing means being operable while the said body is rotating.

10. The combination of two relatively rotatable and at least approximately coaxial members, a body of material having substantially the resilient deformability of vulcanized soft rubber mounted between them, a circumferential series of wear members mounted on said body, and means mounted for axial sliding movement on one of said members, in conjunction with means for resisting movement of translation of said body, for squeezing said body in an axial direction, and thus compelling it, solely by reason of the squeezing, to extend itself radially by deformation, for effecting torque-sustaining connection between said members, said squeezing means being operable while the said body is rotating.

11. The combination of two relatively rotatable and at least approximately coaxial members, and, mounted between them, two generally conical, axially opposed, deformable structures constrained to rotate with one of said members, and means mounted for sliding movement on one of said members for forcing a part of one of the structures axially toward a part of the other structure and thus changing their cone angles for effecting torque-sustaining connection between said members.

12. The combination of two relatively rotatable and at least approximately coaxial members, and, mounted between them, two generally conical, axially opposed, torque-sustaining, deformable structures constrained to rotate with one of said members, and means mounted for sliding movement on one of said members for forcing part of one of the structures axially toward a part of the other structure and thus changing their cone angles for effecting torque-sustaining connection between said members.

13. The combination of two relatively rotatable and at least approximately coaxial members, and, mounted between them, two generally conical, axially opposed, deformable structures constrained to rotate with one of said members, and means mounted for sliding movement on one of said members for forcing a part of one of the structures axially toward a part of the other structure and thus changing their cone angles for effecting torque-sustaining connection between said members, the force-applying means comprising a pair of squeezing members both axially slidable on one of the first mentioned members and a piston and cylinder axially slidable with, and adapted to actuate, the squeezing members.

THOMAS L. FAWICK.